(No Model.) 2 Sheets—Sheet 1.
H. L. HARTENSTEIN.
PROCESS OF UTILIZING WASTE PRODUCTS OF BLAST FURNACES.
No. 596,749. Patented Jan. 4, 1898.
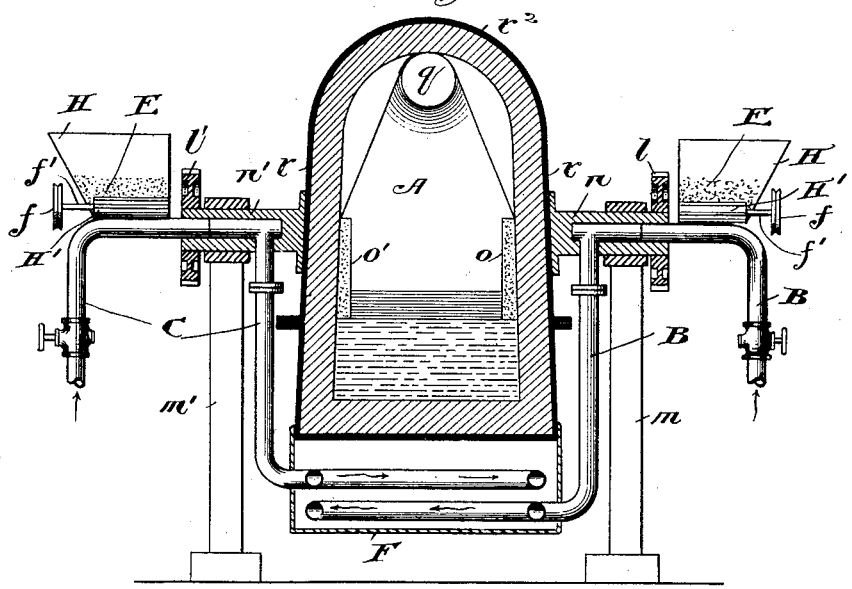
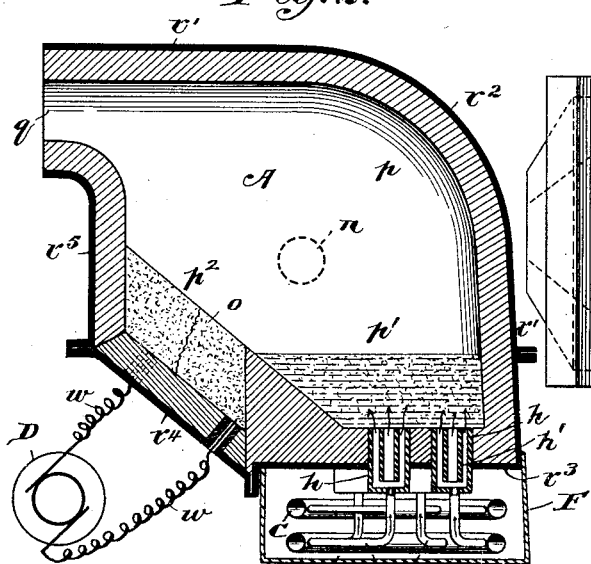
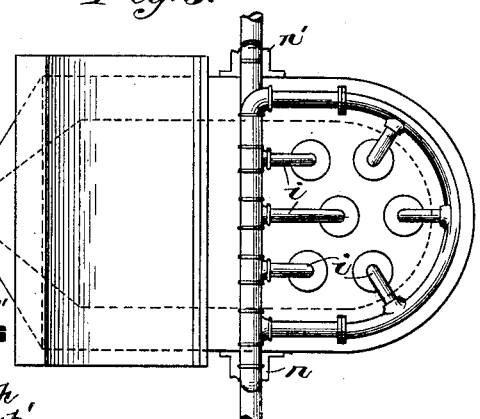
Witnesses,
Inventor,
Herman L. Hartenstein

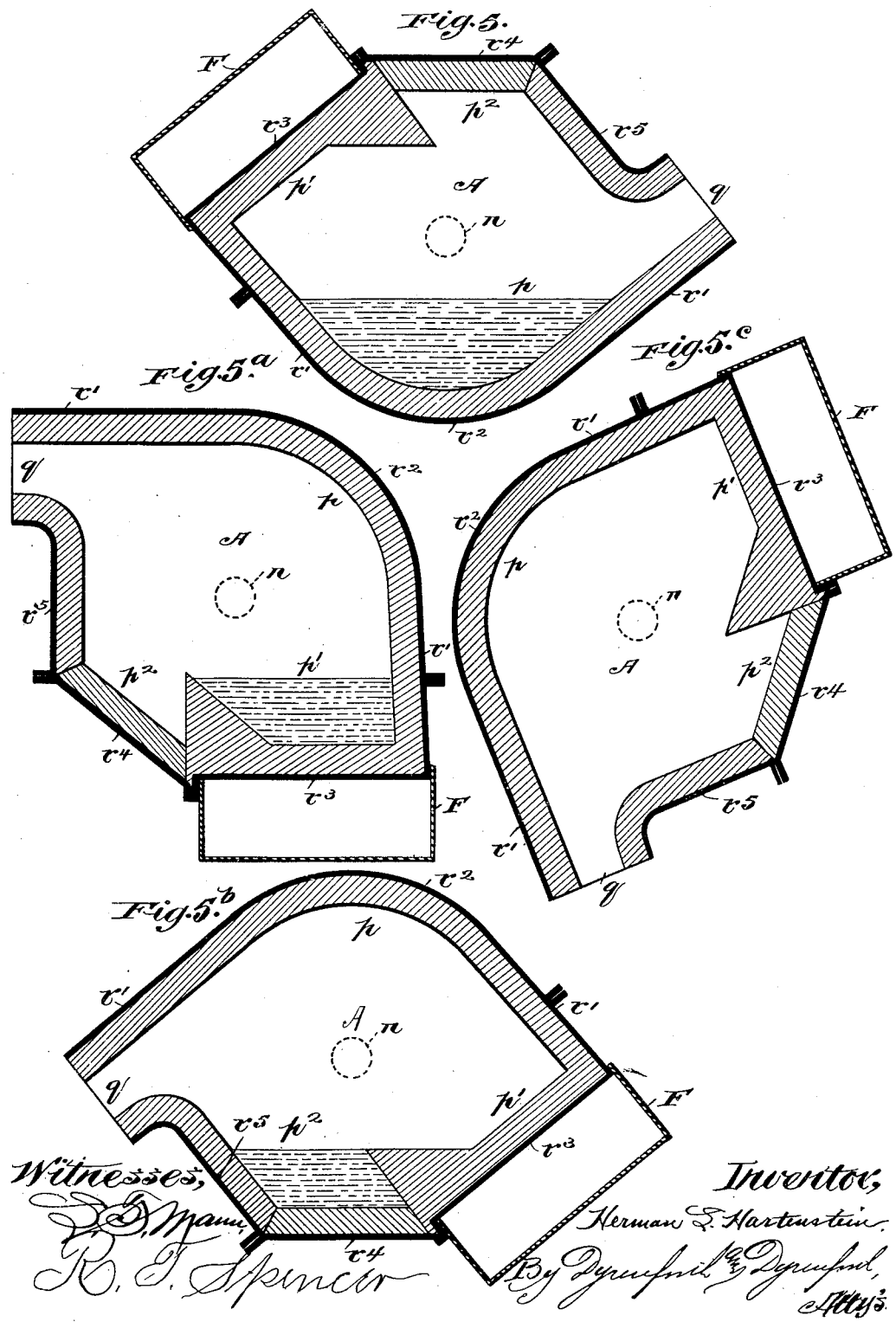

UNITED STATES PATENT OFFICE.

HERMAN L. HARTENSTEIN, OF BELLAIRE, OHIO.

PROCESS OF UTILIZING WASTE PRODUCTS OF BLAST-FURNACES.

SPECIFICATION forming part of Letters Patent No. 596,749, dated January 4, 1898.

Application filed October 27, 1896. Serial No. 610,245. (No specimens.)

*To all whom it may concern:*

Be it known that I, HERMAN L. HARTENSTEIN, a citizen of the United States, and a resident of Bellaire, county of Belmont, and State of Ohio, have invented certain new and useful Improvements in Processes of Utilizing the Waste Products of Blast-Furnaces, of which the following is a specification, reference being had to the accompanying drawings, forming a part thereof, in which similar letters of reference indicate corresponding parts.

There is so comparatively little use for the slag or cinder resulting from the reduction of iron ore in a blast-furnace that it is practically a waste product, the disposal of which is a problem becoming more and more serious in connection with blast-furnace practice.

The object of my invention is to enable this waste product to be manufactured into a valuable commercial compound that shall be useful in various chemical and manufacturing processes, and especially, by reason of its chemical composition, in the manufacture of gas in much the same manner that acetylene gas is evolved from calcium carbid by bringing it into contact with water.

To this end my invention consists in the process employed to accomplish my aforesaid object—namely, of mixing with the slag a suitable proportion of carbonaceous material and subjecting the mixture to the fusing action of an electric current, in the circuit of which the mixture is included as a part thereof. This statement of my process expresses it in its broadest sense. In practicing it, however, it involves certain details hereinafter pointed out. Moreover, it is subject to certain modifications involving the treatment of the slag while primarily in a molten condition, or in the condition in which it is discharged from the blast-furnace, the treatment thereof after it has been solidified by cooling, and the use, with the treatment of the slag in either condition primarily, of a suitable reducing-gas.

The two modifications last referred to, which are intended to be included as within my invention, form the subjects of separate applications for Letters Patent, and the description of the process herein is therefore confined to the treatment of the slag in the molten condition in which it comes from the blast-furnace, with the use, by preference, of a suitable reducing-gas as a heat-intensifying medium through which to effect the mixture with the slag of the carbonaceous material.

The apparatus I have devised as best adapted for use in practicing my improved process is illustrated in the accompanying drawings, in which—

Figure 1 is a view in cross-sectional elevation, partly broken, of my improved converting apparatus; Fig. 2, a view of the same in sectional side elevation; Fig. 3, a bottom plan view of the converter with the pipe-inclosing box removed; Fig. 4, a cross-sectional view of a coke-feeding detail; and Figs. 5, $5^a$, $5^b$, and $5^c$ are sectional views of the converter-chamber, showing it in the different positions to which it is adjusted in use.

A is my improved converter-chamber, preferably of the shape illustrated, with the straight side walls $r$ and end walls $r'$, the latter flaring from a rounded base $r^2$, which connects them, the walls $r'$ being connected from their outer ends by a top formed of three sections $r^3$, $r^4$, and $r^5$ in angular relation to each other, and between the top section $r^5$ and the end wall $r'$ the spout-opening $q$ is formed. The shell of the converter-chamber may be formed of metal lined with refractory material, as indicated, the refractory lining, which I prefer to form of fire-clay, affording both a heat and an electric insulator. For convenience of access to the interior of the chamber A, as for repairing linings, renewing the carbon slabs hereinafter described, and the like, the wall-sections $r^3$ and $r^4$ should be removable and fastened together and to the respectively-adjacent parts of the shell by bolts and keys or other means that will permit expeditious separation of the removable wall-sections.

The terms "base" and "top" above employed are applied to the relative parts of the converter-chamber in the position in which it is shown in Fig. 5, being its initial position or that in which it receives the charge.

The inner construction of the chamber A forms therein the three compartments $p$, $p'$, and $p^2$, the first named being the slag-receiving compartment, the second the mixing-compartment, and the third the electric-treatment compartment. The compartment $p^2$ contains electrodes $o$ and $o'$, preferably in the form of carbon slabs, which are let into grooves (not shown) in the lining of the compartment, through the base of which are connected with the respective electrodes the insulated terminal-wires $w$ and $w'$, (see Fig. 2,) leading from the poles of a suitable electric generator D—say a dynamo-electric machine.

The converter-chamber A is supported on hollow trunnions $n$ and $n'$, respectively, extending from its opposite sides through bearings at the upper ends of suitable standards $m$ and $m'$, and the trunnions carry near their outer ends the cog-wheels $l$ and $l'$, Fig. 1, to be engaged by suitable rack mechanism, (not shown,) but such as is commonly used in steel-mills for turning the chamber on its trunnions, as hereinafter described.

The base of the mixing-compartment $p'$ is pierced by feed-tubes $h$ of refractory material, such as fire-clay, each of which contains a pair of diaphragms $h'$ $h'$ of the same material, reaching short of its base to subdivide the tube into a number of passages for the better distribution of the material which is blown through them, as hereinafter described. These tubes thus form twyers.

B and C are pipes, the one leading from a supply (not shown) of gas under pressure and the other from the same source or from an air-blower (not shown) through the trunnions $n$ and $n'$, in which the pipes are divided, as indicated in Fig. 1, to permit turning with the converter-chamber the depending sections of the pipes, which are connected by branches $i$ with the twyers. A removable box F covers the base of the section $r^3$ to protect the pipes and twyers from injury. In the horizontal stationary portion of each pipe it is slotted longitudinally, the slot $g$ (shown in Fig. 4) being inclosed by a hopper H rising from the pipe and containing a rotary fluted cylinder H′, journaled in the base portion of the hopper to extend lengthwise of and cover the slot $g$, and provided on the outer end of its stem $f'$ with a pulley $f$, through the medium of which to drive the fluted cylinder and cause it to feed with regularity into the pipe through its slot the pulverized carbonaceous material (coke) E contained in the hopper. The cylinders H′ so closely cover the respective slots in the pipes as to prevent escape of gas from the latter.

To start the apparatus, the chamber A should be preparatorily heated by admitting gas into it on opening the valve in the gas-pipe and igniting the gas, as by means of a handful of burning wood or shavings thrown into the chamber. When the chamber has been sufficiently heated, the gas is turned off and the chamber is brought to the position in which it is shown in Fig. 5, in which molten slag is run into it through the opening $q$, either direct from the blast-furnace or, if more convenient, from a ladle, which may be handled through the medium of a hydraulic lift, such as is ordinarily used in steel-works. The supply of molten slag is thus introduced into the compartment $p$. The gas is then slowly turned on and the coke-feeding mechanism is started and is continued in operation under the full pressure of the gas-supply until a sufficient quantity of the carbonaceous material—say about one part of coke to three parts of slag—has been fed, the feeding operation requiring not more than, say, about five minutes, during which the chamber A is slowly turned on its trunnions from the position in which it is represented in Fig. 5 to that in which it is represented in Fig. 5ª and back again. In this manner the molten slag is caused to flow into the mixing-chamber $p'$ and becomes thoroughly impregnated throughout its entire mass with innumerable particles of coke. It may be determined by spectroscopic observation of the carbon-lines of the converter-flame when the mixing has proceeded far enough.

It should be stated that the only use for an air-blast, hereinbefore referred to, is when or if the supply of gas shall be defective, in which event the air may be used in conjunction with the pulverized coke for promoting combustion of the latter to maintain the molten condition of the slag or to restore any lost heat.

On completing the mixing with the slag of the carbonaceous material, when the proportions will be about three parts of slag to one part of carbon, the electric current is turned on, the gas-pressure is turned off, and the converter-chamber is swung to the position in which it is represented in Fig. 5ᵇ, whereby the material is run into the compartment $p^2$.

Blast-furnace slag is a material highly resistant to electricity, being composed (according to the average sample produced in the manufacture of Bessemer iron) of about fifty to fifty-five per cent. of lime, twenty-five to twenty-eight per cent. of silica, sixteen to eighteen per cent. of alumina, and a small proportion of other elements varying in kind according to the ore reduced in the furnace and the limestone employed as a flux. By mixing with the slag the carbonaceous material, which is a good conductor of electricity, and interposing in the circuit the mass of the mixture the latter is rendered conductive, but presents to the passage of the current the resistant property of the slag between adjacent particles of the coke contained therein, whereby innumerable arcs are formed throughout the mass for generating the great intensity of heat requisite for the conversion of the mixture into my new or improved product. This product, being reduced slag, forms the compound calcium-aluminium-silicon carbid, ($Al_2C_3, SiC, CaC_2$,) calcaluminium-silicon carbid. Thus the medium (carbonaceous material) of conversion also affords the medium for the transmission of the current through the mass to be converted to generate the necessary intensity of heat to effect the conversion. The coke deoxidizes and carburets the slag, the reduction requiring no more than about twenty minutes, until the slag is thoroughly carbureted, when the current is turned off and the chamber A is swung to the position in which it is represented in Fig. 5ᶜ to discharge the molten product, which may be cast into ingots or in molds of any desired size and shape. The converter is then ready to be used over again by returning it to its initial position, in which it is represented in Fig. 5, to receive another charge of molten slag.

As an incident of my invention may be mentioned the fact that by enabling the slag to be conveniently disposed of without first requiring it to be handled in running it to a "cinder-bank," in addition to reducing it to a valuable by-product, the cost of making iron and steel is greatly reduced.

While I have herein shown and described especial apparatus for the practice of my process in a particular way, I not intend thereby that my invention shall be limited thereto, as the treatment of the slag to effect the mixture therewith of the carbonaceous material may be produced by forcing the carbon into the molten slag while the latter is running, as from the blast-furnace to a similar receiver, in which, or also while running, the mixture may be subjected to the electrical treatment. Moreover, the slag may be treated, after it has been allowed to solidify by cooling, by melting it preparatorily.

My improved product, as previously described, is the carbid of calcium, aluminium, and silicon. This compound, while susceptible of various chemical uses, is more particularly adapted for the generation of ethylene gas, ($C_2H_4$,) which gas, as is well known, is very efficient for illuminating purposes, burning with an exceedingly bright white flame and without the presence of smoke. This gas, unlike acetylene and other like gases, has no affinity for copper and copper compounds, and hence may be safely used for ordinary house illumination in which the lighting-fixtures are usually of a metal containing copper in various proportions. Ethylene gas has heretofore been made on but a small scale, and the cost of generation by present methods is comparatively very high, owing to the fact that its generation has been effected by heating together in a retort or flask a mixture of alcohol and sulfuric acid. It is also formed in small quantities by the action of heat upon coal and other substances rich in carbon; and while this gas is the most important constituent of illuminating-gas obtained from such material, the amount thus produced in such process has been small, there being on an average but from four to five per cent. in good coal-gas. It may be stated that one thousand feet of ethylene gas is so rich in carbon that it will produce more light than ten thousand feet of common illuminating-gas. Ethylene gas is also highly efficient as an enricher for coal or water gas and is devoid of the danger which arises in the use of acetylene gas at present employed for this purpose. By my invention I am enabled to produce ethylene gas on a commercial scale at a comparatively very low cost by bringing a liquid into contact with my improved carbid, and when so produced the gas is ready for use. By thus cheapening the cost of producing ethylene gas the same may be employed as a substitute for other illuminating-gases, and in addition thereto I am enabled to materially lessen the cost of producing alcohol and ether, as will be evident to those skilled in the art.

By my invention the cost of producing ether is about one-tenth of the present cost, and the cost of producing alcohol is also very materially diminished. My improved product therefore enables the employment of ethylene gas on a commercial scale and reduces the cost of producing ether and alcohol. In addition thereto and as previously stated my invention contemplates the employment of a material—slag—which heretofore has been considered a waste product and which rapidly accumulates and involves considerable expense in its removal. From a waste product the slag becomes of value, and the profits derived from its sale will materially offset the cost of manufacturing iron. The process by which the product is obtained is comparatively simple and is attended by low cost.

What I claim as new, and desire to secure by Letters Patent, is—

1. The process of utilizing the waste product of a blast-furnace, which consists in diffusing through molten slag a suitable proportion of carbonaceous material and subjecting the mixture to the fusing action of an electric current by including it in the circuit thereof, substantially as described.

2. The process of utilizing the waste product of a blast-furnace, which consists in blowing into and thereby thoroughly impregnating molten slag with finely-divided carbonaceous material in suitable proportion and subjecting the molten slag with its admixture to the fusing action of an electric current by including it in the circuit thereof, substantially as described.

3. The process of utilizing the waste product of a blast-furnace, which consists in mixing with molten slag a suitable proportion of carbonaceous material, agitating the mixture to enhance the impregnation of the slag with said carbonaceous material and subjecting the mixture to the fusing action of an electric current by including it in the circuit thereof, substantially as described.

4. The process of utilizing the waste product of a blast-furnace, which consists in forcing with gas-pressure into molten slag a suitable proportion of finely-divided carbonaceous material, agitating the mixture to enhance the impregnation of the slag with said carbonaceous material and subjecting the molten slag with its admixture to the fusing action of an electric current by including it in the circuit thereof, substantially as described.

In testimony that I claim the foregoing as my invention I have signed my name, in presence of two witnesses, this 23d day of October, 1896.

HERMAN L. HARTENSTEIN.

Witnesses:
C. SEDGWICK,
MARCELLA G. MACLEAN.